(12) United States Patent
Tilley

(10) Patent No.: US 8,099,124 B2
(45) Date of Patent: Jan. 17, 2012

(54) METHOD AND SYSTEM FOR CORRELATING USER/DEVICE ACTIVITY WITH SPATIAL ORIENTATION SENSORS

(75) Inventor: Patrick Tilley, Coram, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 853 days.

(21) Appl. No.: 11/734,366

(22) Filed: Apr. 12, 2007

(65) Prior Publication Data

US 2008/0254822 A1 Oct. 16, 2008

(51) Int. Cl.
*H04M 1/00* (2006.01)
(52) U.S. Cl. .................................. 455/550.1; 455/90.1
(58) Field of Classification Search .............. 455/550.1, 455/556.1, 557, 90.1
See application file for complete search history.

(56) References Cited

U.S. PATENT DOCUMENTS

| | | | | |
|---|---|---|---|---|
| 6,002,946 A | * | 12/1999 | Reber et al. | 455/557 |
| 6,411,828 B1 | * | 6/2002 | Lands et al. | 455/569.1 |
| 6,418,325 B1 | * | 7/2002 | Reber et al. | 455/556.1 |
| 7,430,439 B2 | * | 9/2008 | Griffin et al. | 455/552.1 |
| 7,536,201 B2 | * | 5/2009 | Dunko | 455/556.1 |
| 7,567,818 B2 | * | 7/2009 | Pylkko | 455/550.1 |

* cited by examiner

*Primary Examiner* — Yuwen Pan

(57) ABSTRACT

A system and method for determining an operating mode for a mobile unit ("MU"), comprising defining a plurality of spatial regions, tracking at least one activity of the MU when the MU is oriented within the one of the plurality of spatial regions, determining an orientation of the mobile unit, and selecting the operating mode based on the at least one of the orientation and an activity of the MU when the MU is oriented within the one of the plurality of spatial regions.

23 Claims, 3 Drawing Sheets

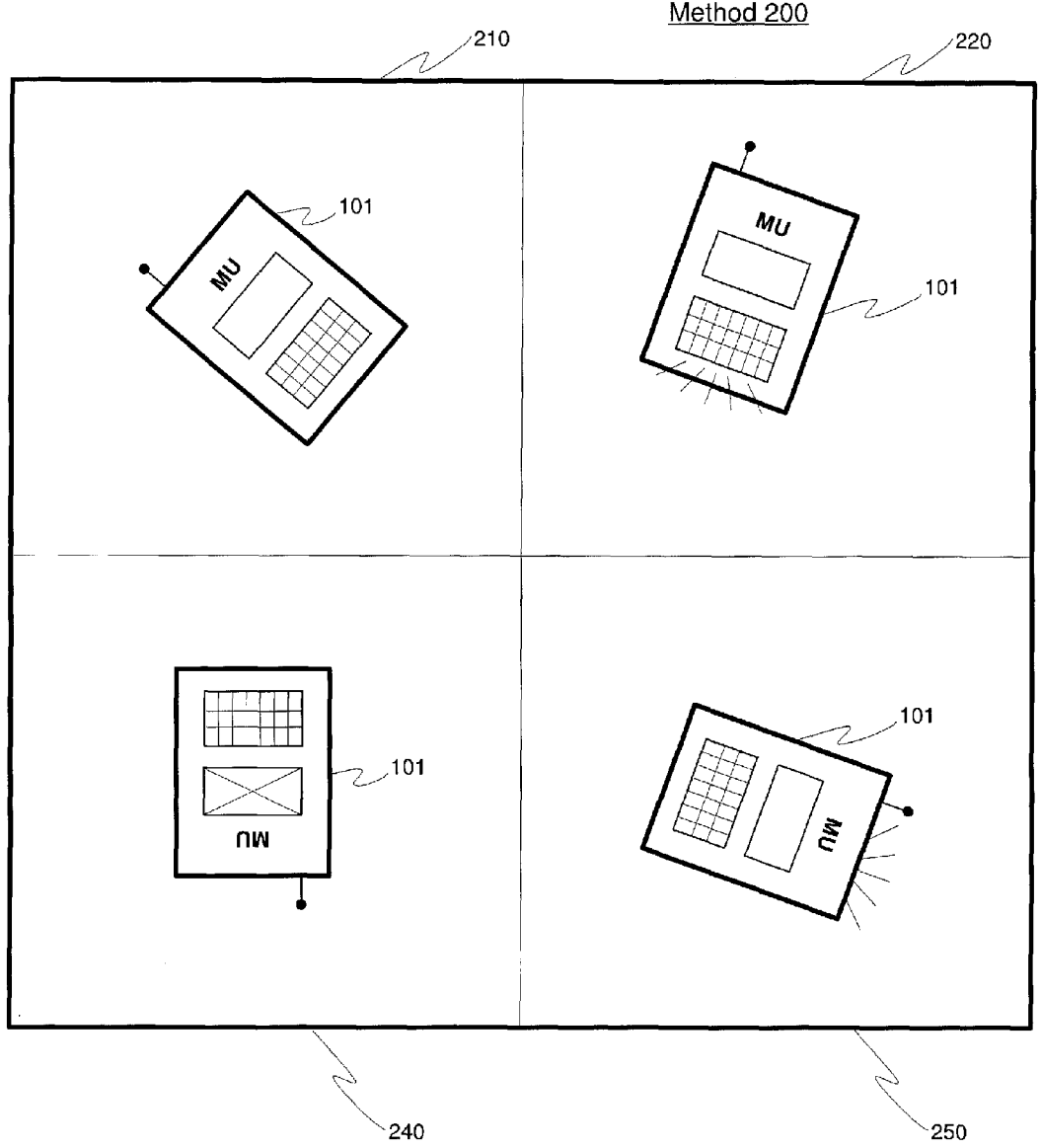

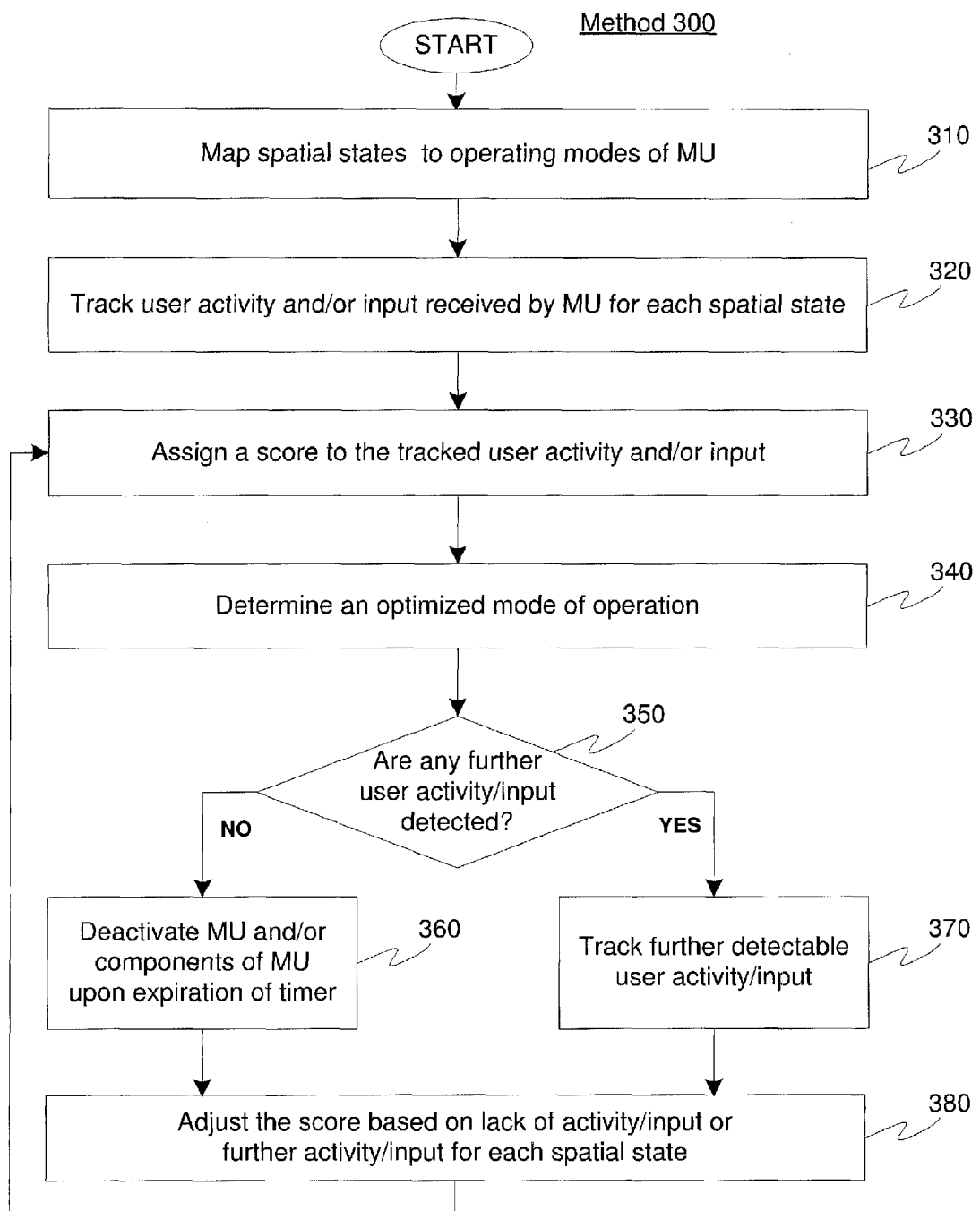

METHOD AND SYSTEM FOR CORRELATING USER/DEVICE ACTIVITY WITH SPATIAL ORIENTATION SENSORS

FIELD OF INVENTION

The present invention is related to systems and methods used for using spatial orientation data from a mobile unit to manage an operating mode of the mobile unit.

BACKGROUND

Business enterprises as well as individuals rely on mobile computing devices, or mobile units ("MUs"), in a variety of situations ranging from basic everyday tasks, such as telecommunications, to highly specialized procedures, such as inventory gathering. As the benefits of utilizing MUs continue to be realized across increasingly diverse industries, the features and capabilities of these products are expanding at a correspondingly rapid pace. In many industries, MUs have gone from fashionable accessories to essential business components used by all levels of personnel.

Accordingly, a demand has developed for MUs to perform complicated tasks quickly, efficiently and reliably. However, as conventional MUs are fitted with more advanced components and software features, sacrifices are often made with respect to power management and user-friendliness. While many methods have been devised attempting to resolve these difficulties, MUs currently continue to suffer from problems of inefficient power usage, complicated operational procedures and on-screen menus, and manual input requirements.

In the ongoing search for solutions to these problems, one aspect of MUs that has remained overlooked is detectable motions and/or spatial orientations of the MUs. From the detectable motions of an MU, valuable information may be extracted from which various predetermined procedures directed at accomplishing some useful end or preventing some harmful result may be executed. Therefore, it is desirable to be able to detect, interpret and utilize the movements and inputs experienced by MUs.

SUMMARY OF THE INVENTION

A method for determining an operating mode for a mobile unit ("MU"), comprising defining a plurality of spatial regions, tracking at least one activity of the MU when the MU is oriented within the one of the plurality of spatial regions, determining an orientation of the mobile unit, and selecting the operating mode based on the at least one of the orientation and an activity of the MU when the MU is oriented within the one of the plurality of spatial regions.

A method for defining a plurality of spatial regions, mapping each one of the plurality of spatial regions to at least one operating mode of a mobile unit ("MU"), the MU including at least one application component, correlating an orientation of the MU with one of the plurality of spatial regions, tracking at least one user activity of the MU within the one of the plurality of spatial regions, assigning a score to the at least one user activity for the one of the plurality of spatial regions when the MU is oriented within the one of the plurality of spatial regions, and based on the score, determining an optimized operating mode for the at least one application component of the MU when the MU is oriented within the one of the plurality of spatial regions.

A system having a spatial region defining means defining a plurality of spatial regions, a mapping means mapping each one of the plurality of spatial regions to at least one operating mode of a mobile unit ("MU"), the MU including at least one application component, a correlating means correlating an orientation of the MU with one of the plurality of spatial regions, a tracking means tracking at least one user activity of the MU within the one of the plurality of spatial regions, an assigning means assigning a score to the at least one user activity for the one of the plurality of spatial regions when the MU is oriented within the one of the plurality of spatial regions, and a determining means determining, based on the score, an optimized operating mode for the at least one application component of the MU when the MU is oriented within the one of the plurality of spatial regions.

BRIEF DESCRIPTION OF THE DRAWINGS

FIG. 2 shows an MU operating in an exemplary three-dimensional space according to an exemplary embodiment of the present invention.

FIG. 3 shows a flow diagram showing an operating of an exemplary embodiment of the present invention.

DETAILED DESCRIPTION

Figure 1:
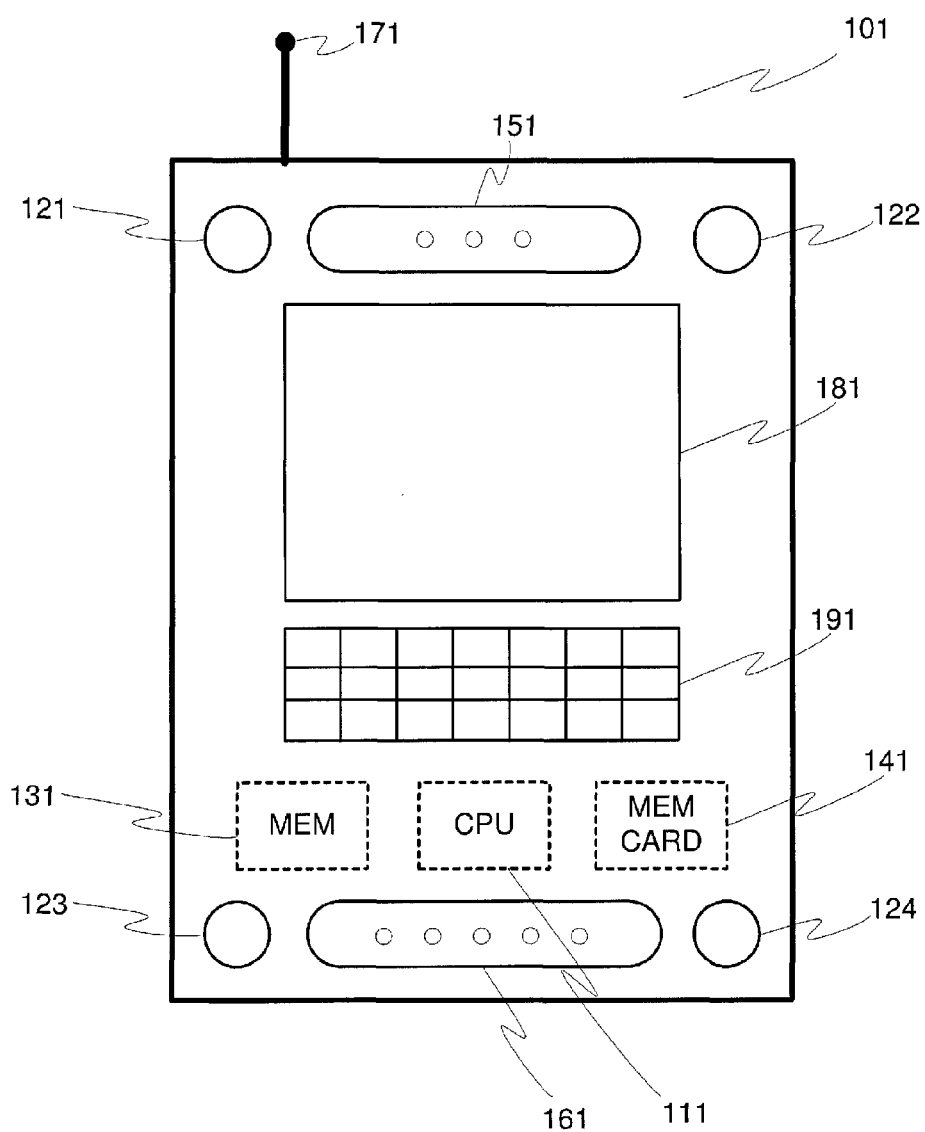
FIG. 1 shows an exemplary MU according to an exemplary embodiment of the present invention.

The present invention may be further understood with reference to the following description of exemplary embodiments and the related appended drawings, wherein like elements are provided with the same reference numerals. The present invention is related to systems and methods used for using spatial orientation data from a mobile unit ("MU") to manage the operating mode of the MU. Specifically, the present invention is related to systems and methods for correlating user activity with MU spatial orientation data and MU motions in order to increase the reliability in the spatial orientation data and optimize the operating parameters of the mobile device. Furthermore, the present invention allows for improved utility of the MU through monitoring and scoring the user activity and associating the activity with a particular orientation region and/or motion of the MU. In other words, the monitoring and scoring of the MU motions may allow for valuable information to be extracted from which various predetermined procedures directed at accomplishing some useful end or preventing some harmful result may be executed. Thus, it is desirable to be able to detect, interpret and utilize the orientation and motions that are experienced by the MU.

According to an exemplary embodiment of the present invention, methods for determining MU orientation such as the use of multi-axis movement and/or spatial sensors to identify various modes of operation (e.g. speaker phone, phone-at-ear, scanning, power optimization). It is desirable to use this information to change the operating mode of the MU. However, if the user is working at different angles it is difficult to reliably use the orientation information to determine the mode of operation unless there is a way to correlate user activity (to predict intent of use) with the orientation state of the MU. This invention includes methods for correlating user activity with MU spatial orientation to enable reliable use of the orientation information for optimizing the operating parameters of the MU. Specifically, the MU may include spatial sensors measuring the motions of the MU, such as acceleration, velocity, and angular velocity in any direction, in addition to the orientation of the MU with respect to the user. The measurements of the motions and orientation of the MU may be compared and contrasted with prerecorded movement patterns or predefined levels within a region. As will be described below, predetermined procedures may then be executed that may be useful in a wide range of applications, including but not limited to power management, display orientation, gesture input, compensating for undesired motion, security, etc.

The term "MU" according to the present invention may also be used to describe any mobile computing device, such as, for example, personal digital assistants ("PDAs"), portable barcode scanners (i.e., laser and/or imager-based scanners), radio frequency identification ("RFID") readers, cellular telephones, voice over Internet protocol ("VoIP") telephone receivers, two-way pagers, digital cameras, portable media players, laptop computers, portable gaming consoles, etc. Various functionalities may be added to the MU through software modules.

FIG. 1 shows an MU 101 according to the exemplary embodiments of the present invention. The MU 101 may be a multi-purpose PDA running a third-party operating system, such as, for example, Microsoft Windows CE, or similar. Alternatively, the MU 101 may be an embedded system running a customer real-time operating system ("RTOS"). The MU 101 may include a processor 111, one or more spatial sensors 121-124, a non-removable memory 131, a removable memory 141, a speaker 151, a microphone 161, an antenna 171, a display 181, and a keypad 191. The processor 111 may be a central processing unit ("CPU") that executes instructions and manages modes of operation based on measurements taken by the sensors 121-124.

The non-removable memory 131 may be any type of memory component that is integrated into the electronic architecture of the MU 101. Furthermore, the non-removable memory 131 may be temporary (i.e., random access memory, or RAM) or permanent (i.e., a hard-disk drive). The removable memory 141 may be any type of detachable memory component that may connect to the MU 101 through an expansion interface, such as, for example, a universal serial bus ("USB") mass storage device (e.g., a memory stick), a secure digital ("SD") card, a mini SD card, a flash memory card, a smart media card, a Personal Computer Memory Card Industry Association card ("PCMCIA card"), a subscriber identity module ("SIM") card, and any removable integrated circuit ("IC") card that may be placed in electrical contact within the expansion interface of the MU 101.

According to the exemplary embodiment of the present invention, the sensors 121-124 may be integrated into the MU 101. The sensors 121-124 may be coupled to a memory arrangement of the MU 101 in which event data (i.e., data relating to the orientation and motion of the MU 101) is stored. In an alternative exemplary embodiment, the sensors 121-124 may be embodied in a separate external device that connects to the MU 101 through the expansion interface (i.e., sensors incorporated into a SD card, a flash memory card, or similar interface). Furthermore, the sensors 121-124 may be of any size. However, according to the preferred embodiments of the present invention, the sensors 121-124 may be small enough so that any added weight and space occupied on the MU 101 is negligible. Because the MU 101 may operate on batteries, the sensors 121-124 may preferably have low power consumption. In addition, the sensors 121-124 may be durable enough to withstand abusive environments.

The sensors 121-124 may be any type of measurement devices capable of monitoring spatial orientation and motion. In the exemplary embodiment, the sensors 121-124 may be, for example, piezoelectric sensors, optical switches, accelerometers, strain/pressure gauges, gyroscopes and other applications utilizing micro-electromechanical systems ("MEMS") technologies, or any combinations of the like. Various regions within a three-dimensional reference frame may be defined and associated with (i.e., mapped to) specific applications and/or operating modes of the MU 101. Within each of these defined regions, the spatial orientation of the MU 101 may include any angular orientation with respect to at least one axis in the three-dimensional reference frame for the MU 101, such as, for example, vertical direction (pitch), horizontal direction (roll), lateral direction (yaw), angular slices, or any combination thereof. Furthermore, the observable motion of the MU 101 may include, for example, a velocity value, an acceleration value, an angular acceleration/velocity value, etc. The methods of detecting and monitoring MU spatial orientation and MU motion, as well as the overall performance of the sensors 121-124, will be described in greater detail below. The methods involve the use of a mechanism for calibrating the reference 3-axis orientation of the MU 101. Such methods include, but are not limited to: user calibration of the reference point by using some type of input (stylus, finger, audio, gesture); calibration at manufacturing; and/or calibration in a known orientation such as when docked in a docking station. User activity is related to the relative orientation of the device to one or more of these reference points. In this way the MU 101 shall determine whether it is upside down (e.g. based on manufacturing or docking station calibration), pointed away from the user (e.g. based on user calibration), or any other relative orientation offset from the appropriate calibration method.

The MU 101 may include further application-specific components (not shown). These components may include, but is not limited to, a keypad light source, a touch screen, a digital camera, a digital audio recorder, microphone, an optical scanner, a scanner trigger, an RFID tag, an RFID reader, a wireless network interface controller (i.e., a 802.11x network card), etc. According to the exemplary embodiments of the present invention, the processor 111 of the MU 101 may monitor any input received via one or more application-specific component during user activity. The detected motion and orientation of the MU 101 may be used by the processor 111 to determine the functionality and/or a mode of operation for the MU 101 and/or for one or more of the components of the MU 101.

According to the exemplary embodiment of the present invention, examples of the different types of sensors 121-124 and the respective user-initiated activities that they detect may include, but are not limited to, multi-axis accelerometers for determining the orientation of the MU 101, multi-axis accelerometers for detecting specific user actions in a specific application, keypad sensors for detecting user activity (in general or within a specific application), touch screen sensors for detecting user activity (in general or within a specific application), audio interface (i.e., microphone) sensors for monitoring voice input, scanner trigger sensors for detecting user activity (in general or within a specific application), volume control sensors for detecting user activity (in general or within a specific application), interface device activity (i.e., via a networking device, an RFID device, an infrared data association ("IrDA") device, a USB port, etc.) for detecting operating modes that may be used to learn and modify the operation of the MU 101 within a specific spatial region, sensors of mechanical action by the user (i.e., opening a cover on the MU 101, extension of a keypad, etc.) for detecting the activity (in general or within a specific application), operation of an accessory device (i.e., a printer, a data input peripheral) for detecting user activity or a specific operating mode (in general or within a specific application), insertion of a module (i.e., memory card, networking adapter card, etc.) for detecting user activity or detecting a change in an operating mode of the MU 101.

The sensors 121-124 may be used to monitor any detectable activity by the user or by the MU 101, regardless of whether the activity is monitored via a hardware component of the MU 101, a software component of the MU 101, or any combination thereof. Furthermore, while the exemplary MU 101 is illustrated with four sensors 121-124, any number of sensors may be placed within or on the MU 101.

According to the exemplary embodiment of the present invention, the various operating modes of the MU 101 may include, but are not limited to, orientation of the display 181 (i.e., landscape, portrait, zoom, etc.), power state of the display 181 (i.e., full power, low power, no power, etc.), brightness of the display 181, power state of the keypad light source, power state of communication interfaces (i.e., the speaker 151, the microphone 161, etc.), power state and/or operating mode of various computing and communication assets, operating of an array of omni-directional microphones distributed within the MU 101, selection of an antenna 171, steering of a speaker element beam (i.e., changing the direction of a major lobe of a radiation pattern, usually through switching antenna elements), combining of signal diversity (i.e., using multiple antennas to send and receive data to improve the quality of the signal), etc.

FIG. 2 shows the various operationally significant spatial states or orientations that the MU 101 may adopt in an exemplary three-dimensional space 200 according to the exemplary embodiments of the present invention. Specifically, the MU 101 may be manipulated by the user into any of a plurality of various spatial regions or states 210-240 within the three-dimensional space 200. Each such state may be detected by the MU 101 via the sensors 121-124, as a consequence of which the MU 101 produces orientation and position information that controls the operating mode of the MU 101. The manner in which the MU 101 works depends on the way that it is oriented and positioned. Specifically, when the MU 101 is oriented by the user in the way shown in the spatial state 210, the MU 101 may configure itself to operate in a telephone-to-ear telecommunications mode because in region or state 210, the MU 101 detects its orientation and positioning near a user's head as indicative of it being held as a telephone; the MU 101 in spatial state 220 may operating in a speakerphone telecommunications mode; the MU 101 in spatial state 230 may operate in an optical scanner mode; and the MU 101 in spatial state 240 may place itself in an idle or power-off mode (e.g., when the MU 101 is placed in a holster, or suspended from a belt of the user, etc.). Thus, each one of the spatial states 210-240 may be mapped in memory to one or more applications or modes of operation of the MU 101.

In additional, as described above, the MU 101 may include a processor 111, one or more spatial sensors 121-124, a non-removable memory 131, a removable memory 141, a speaker 151, a microphone 161, an antenna 171, and a display screen 181. The processor 111 of the MU 101 may monitor the user activity (i.e., the way the user is using the MU 101) while it also detects the spatial states of the MU 101. The processor 111 assigns a score indicating which applications and/or modes of operations are being used within which of the states 210-240. Each state 210-240 may have an assigned score that counts the number of times in which an application or mode of operations is used within that state. Thus, the score allows the processor 111 to "learn" which applications or modes are used most often for each of the states 210-240 in which the MU 101 may be oriented and positioned. As described above, the user activity may be monitored by the processor 111 through the use of a plurality of sensors 121-124 within the MU 101. Thus, the processor 111 may assign a score to various user actions within each of the states 210-240 in order to determine optimal operating parameters of the MU 101. For example, it may be desirable for the display screen 181 of the MU 101 to be powered down, or, alternatively, to operate in a low-power mode, when the MU 101 is within a spatial state or region according to the which display screen 181 is oriented away from the field of vision of a user. The spatial orientation reference point is determined by using the above-defined exemplary calibration methods.

The sensors 121-124 may detect user activity through observable changes in the directional orientation and the motion and generate MU orientation data and MU motion data, respectively. Based on the monitoring of MU orientation data and MU motion data, the processor 111 may be trained to adjust the score of the data in order to associate the orientation and motion of the MU 101 with an optimized operating mode. In other words, the predominant type of user action within one of the spatial states 210-240 (e.g., spatial state 210) may be to use the MU 101 as a telephone. The processor 111 of the MU 101 "learns" to associate the telephone-to-ear mode of operation with the MU 101 having the orientation and positioning of spatial state 210. The processor 111 may modify the association of the MU orientation with the user actions over time as the use of the MU 101 is changed. For example, if the use of a touch screen on the MU 101 ceases for a period of time while the MU 101 is oriented within spatial state 210, then the correlation of spatial state 210 as an active region for the touch screen is modified to be inactive. According to an exemplary embodiment of the present invention, the states 210-240 and the user actions may be further associated with multiple applications of the MU 101 within the user scope, thereby allowing different applications to use different spatial associations.

According to an exemplary embodiment of the present invention, the processor 111 may compare the MU orientation data and MU motion data to predetermined data, or default settings. For example, the default settings may be a specific orientation within one of the spatial states 210-240, such as, an angle and/or a height in which the user is holding the MU 101 that is indicative of a telecommunications mode of operation for the MU 101. The angle and height of the MU 101 detected by the sensors 121-124 may be compared to the default setting in order to determine whether the user is holding the MU 101 in position to communicate over the telecommunication components of the MU 101. Thus, according to exemplary embodiments of the present invention, a particular predetermined procedure, such as, for example, the activation of the speaker 151 and the microphone 161 of the MU 101, may be selected and executed. The processor 111 may retain the MU orientation data and the MU motion data and append the data with additional information, such as, for example, sequential numbering of the events, time and date for each event, acceleration data, data corresponding to a status of the MU 101 at the date/time of the event, environmental factors, a direction of orientation and/or motion, etc. By retaining the orientation and motion data, the processor 111 may "learn" to whether a particular state is associated with a mode of operations selected by the user. Accordingly, as will be described in further detail below, the processor 111 may adjust the default settings based on the user's activity in order to anticipate a desired mode of operations for a user based simply on the detected orientation and motion data of the MU 101.

Depending on the application of the present invention, various predetermined procedures may be performed based on the MU orientation data and MU motion data. For example, the MU orientation data and MU motion data may be stored in non-removable memory 131 and/or the removable memory 141 prior to executing any other procedures.

Alternatively, the MU orientation data and MU motion data may not need to be stored locally at all; instead, the data is transmitted in real-time for storage and/or further processing by a centralize server or a remote storage device. Such a transmission may be accomplished via the communication arrangement within a mobile wireless network. An exemplary wireless network may be a wireless local area network ("WLAN") for providing radio communication between several devices using at least one wireless protocol, such as those of the 802.1x standards. The wireless local area network may use radio frequency ("RF") communication channels to communicate between multiple mobile units ("MUs") and multiple stationary access points. Further exemplary wireless networks include, but are not limited to, a wireless wide area network ("WWAN"), a wireless personal area network ("WPAN"), etc. In addition, exemplary embodiments of the present invention may be deployed in an operating environment utilizing a private wireless network, such as a virtual private network ("VPN") of a business enterprise.

The foregoing embodiments of the mobile wireless network and the MU 101 are not to be construed so as to limit the present invention in any way. Those skilled in the art would understand that various types of MUs may be used to communicate over the same data network, as long as they work under compatible protocols. Other configurations with different numbers of MUs, access points ("APs"), or client and server computers may also be used to implement the system and method of the present invention. Those of skill in the art would understand that the APs may provide secure network access to a plurality of MUs within the range of the APs, wherein the network is the Internet, an intranet, a LAN, or any other network architecture.

Furthermore, those of skill in the art would understand that, alternatively, the MU 101 may directly transmit the MU orientation data and MU motion data to a separate server via a wired network. Such transmission may be accomplished via a USB or Ethernet-enabled networking device. For example, rather than real-time reporting, the MU 101 may only be required to connect periodically to the wired network for updates on their movements as monitored by the sensors 121-124. Furthermore, no wireless capabilities or communications network may be needed entirely. In such a situation, the sensors 121-124 makes measurements to be processed internally for use locally by the users or manufacturers. For example, measurements of the MU orientation data and MU motion may be used to suggest replacing or repairing the MU 101 due to exceeding a predetermined threshold for damage and may be in danger of malfunctioning.

FIG. 3 shows a method 300 according to an exemplary embodiment of the present invention. The exemplary method 300 will be described with reference to the exemplary embodiments of FIGS. 1 and 2. Accordingly, method 300 may allow for optimizing the operating parameters of the MU 101. As described above, the operation of the MU 101 may be taken into account in order for the processor 111 to determine whether a particular spatial orientation of the MU 101 will activate an optimization action. The processor 111 may monitor specific user activity within the three-dimensional space 200 and associate each activity with a particular orientation state of the MU 101. Thus, the processor 111 is able to correlate the MU orientation with specific user modes of operation.

In step 310, the three-dimensional space 200 may be divided into a plurality of spatial states 210-240. Boundaries for each of the spatial regions may be identified and mapped to various operating modes and/or applications of the MU 101. The boundaries and states of FIG. 2 are not limited to what is shown therein, but may instead correspond to more intricate spatial categories. Specifically, certain regions may be simple regions, for example, such as, angular slices, vertical regions, horizontal regions, while further complex regions may also be mapped as well. As described above, the spatial regions may relate to a particular orientation of the MU relative to the three-dimensional space 200.

For example, the state 210 of space 200 may be mapped to the operating mode of telephonic communication over the MU 101, in addition to any applications related to this operating mode (i.e., operation of the speaker 151, operation of the microphone 161, operation of the antenna 171, etc.). In a further example, as described above, the state 230 of space 200 may be mapped to the operating mode of gathering inventory with the MU 101 via an optical scanner. The applications related to the operating mode of the state 230 may include operation of a scanner of the MU 101, operating of the display screen 181, operation of the speaker 151, etc. In a further example, the state 230 of space 200 may be mapped to the operating mode of wirelessly transmitting data to a centralize server. The applications related to the operating mode of the state 230 may include operation of the display screen 181, operating of the antenna 171, etc. Finally, in a further example, the state 240 may be mapped to placing the MU 101 in a low-power or a no-power operating mode. Therefore, the state 240 may relate to an inactive position and/or stationary position of the MU 101, whereby each of the components of the MU 101 may be turned off.

It is important to note that while each of the states 210-240 of space 200 may be mapped to specific operating modes of the MU 101 based on the orientation and movement of the MU 101, any changes in user activity during the various operating modes may dynamically adjust the mapping for each of these states 210-240. Thus, the initial mapping of the states 210-240 may be a default mapping based on anticipated user activity for the MU 101, and this default mapping is subject to adjustment due to the learning capability of the MU 101 to associate states 210-240 with user activities not subsumed within the default mapping. For example, the default setting of state 230 is for the MU 101 to operate in a scanner mode. The MU 101 that is detected in state 230 may default to that mode. The MU 101, however, is not blocked from being used in a different mode while in state 230. After defaulting to the scanner mode, the MU 101 may be operated differently than a scanner even while the MU 101 is positioned in state 230. The processor 111 can detect and learn from such deviations of a current default setting so that if they happen enough times, a new default setting for state 230 will be set.

In step 320, the processor 111 may track the user activity and/or input received while the MU 101 is within each of the spatial states 210-240 using the sensors 121-124. The tracking of the user activity may indicate the occurrence of an event related to a specific operating mode of the MU 101. For example, the orientation of the MU 101 within state 210 combined with user input related to initiating telephonic communication (i.e., keypad input, transmit or "send" instruction) may indicate the occurrence of placing a telephone call via the MU 101. Alternatively, the orientation of the MU 101 within state 230 combined with scanning input (i.e., scanner trigger input, image/barcode input) may indicate the occurrence of gathering inventory via the MU 101. Therefore, through the use of the sensors 121-124, the processor 111 is capable of tracking activity related to both the orientation of the MU and the input received through the MU 101. Thus, the manner in which the MU 101 is operated by the user (i.e., the operating mode, use of various components) within a particular spatial region may be tracked by the processor 111.

In step 330, the processor 111 may assign a score to the tracked user activity and the tracked input received via the MU 101 within each of the spatial states 210-240. The tracked user actions and/or inputs may be scored to determine which of the spatial regions require specific components or applications of the MU 101 to be in operation. In other words, the score may be an indication of which operating modes are being used within a particular region. Thus, the scores for each of the states 210-240 may correlate various user activities with orientation of the MU 101, and may be used to subsequently modify the operating parameters of the MU 101. For example, while the MU 101 is within state 210, the processor 111 may assign a score to specific user activities, such as, for example, keypad input, transmission instructions, voice input, trigger input, etc. Furthermore, the processor 111 may also incorporate into the score any lack of activity or input (i.e., the MU 101 is in an idle mode) for a preset time while the MU 101 is within the state 210.

Since each of the user activities tracked may be related to different applications and/or operating modes of the MU 101, the scores for each operating mode and/or applications of the MU 101 may be counted while the MU 101 is within state 210. Specifically, the scores for MU 101 in state 210 may count the number of times the user operates a specific application and/or mode while the MU 101 is in the state 210. Each score may increase or decrease depending on the manner in which the user operates the MU 101. Thus, the processor 111 may use the scores to determine which application and/or operating mode is most likely to be appropriate when the MU 101 is oriented within the state 210. As the score within the state 210 indicate an increase in activities related to telecommunications, a determination may be made that when the MU 101 is within state 210, then the speaker 151, microphone 161 and antenna 171 should remain operable while other components, such as any data capturing components (i.e., an imager, scanner, camera), are powered off or placed in a low-power mode. Alternatively, as the score within the state 210 indicates a decrease in activity or no user activity for a preset duration of time, a determination may be made that when the MU 101 is within state 210, each of the components and/or the MU 101 may be powered off or placed in a power conservation mode (i.e., low-power mode or idle mode). Thus, the processor 111 may use the scores for the state 210 in order to designate which components are to be activated or deactivated when the MU 101 is oriented within state 210.

In step 340, the processor 111 may determine an optimized mode of operation for the MU 101 and/or for at least one component of the MU 101. As discussed above, the MU 101 may have a default, or initial, mode of operation for at least one component while the MU 101 is within each of the spatial states 210-240. As the score within each state 210-240 increases or decreases due to the tracked user activity or lack of activity, the processor 111 may modify the performance of the MU 101 and specific modes of operation. Specifically, the processor 111 may trigger an optimization action based on an orientation of the MU 101 within one of the spatial states 210-240 and the corresponding scores for that region. Thus, once the user activity within the region is tracked and scored by the processor 111, the processor 111 may then selectively activate or deactivate certain components of the MU 101 corresponding to the orientation of the MU 101.

According to an exemplary embodiment, the scores for an application or mode within each of the states 210-240 may be compared to a predetermined threshold value (i.e., a minimum number of uses). Once a score for a particular application or mode achieves, or surpasses, this predetermined threshold value within a specific state, the processor 111 may assign that application or mode as the default application or mode of that state. In other words, due to the user's repeated use of this particular application or mode within one state, the processor will adapt or "learn" to automatically operate that application or mode when the MU 101 is within that state. According to an alternative exemplary embodiment, the scores for each application and/or mode for each of the states 210-240 may be compared to one another. Therefore, within each of the states 210-240, the processor 111 may count which application or mode is used the most by the user. In other words, the processor 111 may determine which application or mode has the highest score within a particular state, thereby indicating that it is used the majority of the time. For example, if the default mode of operation for the state 210 is used the majority of the time by the user, then repeated use of this mode in state 210 will increase the score for that mode, further confirming to the processor 111 that this mode is optimal for the MU 101 while it is within the state 210. However, if the default mode of operation within state 210 is not the preferred mode of the user, the user may override the default mode to increase the score of an alternative mode of operation. Once the score of the alternative mode surpasses the score of the default mode, the processor 111 may change the default mode to be the alternative mode. Thus, any changes in usage by the user within a particular state will monitored by the processor 111 and will gradually adjust the default mode of operation for the MU 101 within any state.

In step 350, the processor 111 may make a determination as to whether there is any further detected user activity received via MU 101 or MU motion within a preset duration of time. Specifically, the processor 111 may use a timer to determine whether the preset duration of time has expired prior to detecting any user activity or MU motion. If there is no user activity or MU motion is detected upon expiration of the timer, the method may advance to step 360. In step 360, the processor 111 may deactivate the MU 101 and/or one or more components of the MU 101. In addition, for every instance where the timer expires, the method 300 may advance to step 380 where the processor 111 may decrease the score for the user activity within the current spatial region.

If it has been determined that there was further detectable user activity, in step 370, the processor 111 may track the further user activity. The further user activity may be activation or deactivation of a specific component of the MU 101. As described above, the processor 111 may have a default activation setting (i.e., on, off, low-power, etc.), or alternatively no activation setting (i.e., non-assigned setting), for one or more of the components of the MU 101 for each of the spatial states 210-240. The default activation setting may not suit the needs of the user while the MU 101 is oriented in a specific region, such as, for example, state 210. In other words, the default settings may incorrectly assume the intended use of one or more of the components of the MU 101 while the MU is within 210. Therefore, the further detectable user data activity may be to override the default or non-assigned setting.

One example would be that the default setting of a scanner component on the MU 101 is deactivated while the MU 101 is oriented within spatial state 210. However, the user may desire to operate the scanner component while the MU 101 is within the state 210. Thus, in step 370, according to this example, the user may actuate a scanner trigger on the MU 101 to activate the scanner component.

In step 380, the processor 111 may adjust the spatial region score based on either the lack of user activity or further user activity. The adjustment of the score allows the processor 111 to dynamically modify the operating modes of the MU 101 when the MU 101 is oriented in each of the spatial states 210-240. As described above, an increase or decrease in the scores within each state 210-240 may be dependent on the detectable user activity within that specific region. For example, a score may increase due to user activity of a component within the state 210, or the score may decrease due to user inactivity within the state 210. Once the score for a component within the state 210 exceeds a predetermined threshold value, the processor 111 may automatically activate that component each time the MU 101 is oriented within the state 210. Alternatively, by decreasing the score within the state 210 to null, certain components of the MU 101 may be automatically deactivated by the processor 111 each time the MU 101 is oriented within the state 210. Thus, the processor 111 may continuously learn from the behavior and orientation of the MU 101 in order to optimize the operation of the MU 101.

After step 380, the processor 111 may return to step 330 and use the adjusted spatial region score to optimize the operations of the MU 101. For example, the initial score for the MU 101 may indicate that the use of display screen 181 is null while the MU 101 is within spatial state 210. A score of null for the display screen 181 may deactivate the screen 181. However, this deactivation may be overridden through various user input, such as, for example, depressing a display activation button, touching the display screen 181, touching any key on the keypad, etc. Each instance where the user overrides the deactivation of the screen 181 within the state 210 may increase the score for the screen 181 in that region. Once a predetermined score has been reached (e.g., ten times), the processor 111 may activate the screen 181 when the MU 101 is placed within spatial state 210. Accordingly, any subsequent lack of use of the display may gradually decrease the score for the screen 181 within the state 210. Thus, the user activity may be "learned" by the processor 111 in order to dynamically associate the orientation of the MU 101 with the operating mode desired by the user.

In one exemplary embodiment of the present invention, the MU 101 may selectively activate mobile communications capabilities based on a spatial orientation of the MU 101. Specifically, the MU 101 may be usable as a mobile phone having full-duplex and/or half-duplex modes. In the full-duplex mode, the MU 101 may be used as a conventional mobile phone and being held close to the user (as a telephone handset) so that the user can talk and listen simultaneously. According to this exemplary embodiment, a user orientating the MU 101 within spatial state 210 may correlate to the use of the MU 101 in full-duplex mode. Thus, the use of the MU 101 within state 210 may be referred to as a near-field modality.

In contrast, the MU 101 may also be used in the half-duplex mode as a "walkie-talkie" (i.e., a push-to-talk ("PTT") mode). According to this exemplary embodiment, a user orientating the MU 101 within spatial state 220 may correlate to the use of the MU 101 in half-duplex mode. Specifically, when the MU 101 is within state 220, the MU 101 is typically held at a distance from the user, i.e. a far-field modality. Within this state 220, the MU 101 may enable a speakerphone functionality and the PTT mode in order for the user to hear signals from the speaker even at the distance from the MU 101. Furthermore, the use of the speakerphone functionality may also include increasing sensitivity of a microphone and/or using signal processing techniques for the user's speech, as is conventionally known.

According to the exemplary embodiment of the present invention, the processor 111 may use the data detected by the sensors 121-124 to switch between the near-field and far-field modalities. Furthermore, the processor 111 may selectively activate and deactivate the mobile communications functionality and/or the MU 101 based on the orientation of the MU 101. For example, when the tracked user activity indicates that the MU 101 is being held as the telephone handset within state 210, the near-field modality is activated. When the tracked user activity indicates that the MU 101 is being held as the walkie-talkie within state 220, the far-field modality is activated (and the near-field modality deactivated). Additionally, the MU 101 may activate the mobile communications functionality (and, optionally, itself) when the tracked user activity indicates that the MU 101 is simply in use (or the user is holding the MU 101 for intended use) and deactivate the mobile communications functionality (and, optionally, itself) when the tracked user activity indicates the MU 101 is not in use (e.g., hooked to a user's belt, at his side, motionless, etc.).

In addition, according to a further exemplary embodiment of the present application, the spatial state 210 may involve placing the MU 101 in a docking station. The docking station may act as a power source to the MU 101, thereby recharging the batteries of the MU 101 while docked. Additionally, for example, the docking station may act as a communication link to a centralized server or remote storage device for the MU 101. According to this example, when the MU 101 is within spatial state 210, the processor 111 may power off any of the data collecting components and dump the gathered information into the central memory device while docked. Thus, once the gathered information is dumped in the centralized server or remote storage device, the information may be easily organized and analyzed. Those of skill in the art would understand that the MU 101 may alternatively communicate with the centralized location via a wireless transmission from the docking station.

Furthermore, the sensors 121-124 may determiner a directional of the MU 101 with respect to the user. As described above, it may be possible to enhance current power management systems by turning on and off various systems when appropriate. For example, the display screen 181 and/or a backlight of the MU 101 may use a large amount of the available power supply. Utilizing the orientation aspect of the sensors 121-124 may enable the MU 101 to selectively operate the display screen 181 and/or backlight only when the display screen 181 and/or backlight are within the viewing angle and range of the user. Specifically, the display screen 181 and/or backlight may be shut off to save power when the MU 101 is rotated past the viewing angle or brought beyond the visible distance for a predetermined time period. Alternatively, when the MU 101 is rotated back within viewing angle of the user or brought within the visible range, the display screen 181 and/or backlight may be turn back on.

According to a further embodiment of the present invention, the power management of the MU 101 may be optimized by switching the MU 101 into a power conservative state when not in use. Conventional power management systems typically shut down the MU 101 or switch into idle mode after a preset amount of time transpires with no interaction from the user. The preset time period is usually adjustable by the software of the MU 101. Exemplary embodiments of the present invention may use the lack of motion as an additional trigger to switch the MU 101 into idle or shut down modes, thereby taking advantage of the tendency of the MU 101 to be in motion when in operation, and conserving energy when the MU 101 is at rest. The amount of motionless time needed to trigger the power saving state may also be adjustable by the software of the MU 101.

According to a further embodiment of the present invention, the MU 101 may detect gesture input through the sensors 121-124 based on user activity. The advantages afforded by increasingly advanced computing products are often offset by sacrifices to usability and user-friendliness. Elaborate menus, onscreen buttons, procedures or the like may frustrate users and impede rather than advance productivity. The ability to sense and analyze gesture input through the sensors 121-124 may enable the MU 101 to recognize and react to various motions or gestures from the user. Thus, these motions or gestures may be pre-established to trigger the MU 101 to perform various functions or change specific operating modes that may have otherwise required manual actuation.

For example, if the display screen 181 of the MU 101 is in a document viewing mode and orientation, the sensors 121-124 may detect a quick flip of the user's wrist to coincide with the software application flipping to the next page of the document. In another example, the sensors 121-124 may detect a wrist rolling gesture from the user to trigger the MU 101 to start scrolling down a list displayed to the user on the display screen 181. In a further example, the sensors 121-124 may detect a motion corresponding to a certain pre-recorded gesture to trigger the MU 101 to turn on a component having data capturing capabilities (i.e., an imager, scanner, camera).

According to a further embodiment of the present invention, the processor 111 of the MU 101 may be capable of compensating for any undesirable motions detected by the sensors 121-124. Although not as detrimental to the MU 101 as motion constituting abuse, the detection of minor motions may still adversely affect applications that require as little motion as possible. For example, MU 101 having data capture capabilities such as various camera technologies may produce blurred or out-of-focus images when the MU 101 is in motion. Various methods have been developed attempting to offset such undesirable effects, such as weights or stands that minimizes or cancels out extraneous motion. Exemplary embodiments of the present invention may be utilized to address this problem without the need for cumbersome physical attachments or mechanical devices. The processor 111 may recognize, process, and desensitize any undesirable motion through various software applications of the MU 101. Specifically, the processor 111 may identify a non-acceptable operating situation to the user due to motion through the display or other alert mechanisms, and/or automatically have the software compensate for the motion during the data capture event.

Furthermore, when the MU 101 is equipped with the display screen 181, the orientation sensing capability of the exemplary embodiments of the present invention may conveniently adjust the display orientation with respect to the user. For example, the display screen 181 typically format display data in landscape or portrait mode. The orientation of the MU 101 to be monitored relative to the user, thereby enabling the display screen 181 to automatically switch the format of the display data between landscape mode and portrait mode.

According to a further embodiment of the present invention, the sensor 121-124 of the MU 101 may be used for purposes of security. Due to the fact that the MU 101 is portable, it may be easily misplaced or stolen. Accordingly, the sensors 121-124 of the MU 101 may be able to incorporate security features that indicate location of the MU 101 to the user or prevent use by unauthorized personnel. For example, when the MU 101 is at rest for a preset period of time (i.e., while recharging, during overnight storage), the MU 101 may enter into a secure mode and be programmed to trigger an alarm when the sensors 121-244 detect any motion of the MU 101. This alarm may be local to the MU 101, using audible, visual, or mechanical features. Furthermore, or as an alternative, the alarm may be triggered in a remote device on-site or off-site using the previously described antenna and communication systems. The MU 101 may utilize tracking technologies, such as, for example, a global positioning system, in order to convey its location to the user. In addition, the security features may additionally lock terminal applications, preventing the MU 101 from being used until the user is authenticated (i.e., an authorized user password is entered).

It will be apparent to those skilled in the art that various modifications may be made in the present invention, without departing from the spirit or the scope of the invention. Thus, it is intended that the present invention cover modifications and variations of this invention provided they come within the scope of the appended claimed and their equivalents.

What is claimed is:

1. A method for determining an optimized operating mode for a mobile unit ("MU"), comprising:
    defining a plurality of spatial regions relative to a predetermined reference point;
    tracking an intended use of the MU when the MU is oriented and positioned within one of the spatial regions, wherein the intended use includes at least one of using an application executing on the MU and selecting an operating mode of the MU;
    determining an orientation and a position of the MU within the one spatial region;
    assigning a score to the intended use for the one spatial region when the MU is oriented and positioned within the one spatial region; and
    selecting the optimized operating mode based on the score corresponding to the intended use of the MU when the MU is oriented within the spatial region.

2. The method according to claim 1, wherein the tracking the intended use of the MU is performed by at least one sensor within the MU.

3. The method according to claim 2, wherein the at least one sensor includes one of a piezoelectric sensor, an optical switch, a multi-axis accelerometer, a pressure gauge, and a micro-electromechanical gyroscope.

4. The method according to claim 1, wherein the optimized operating mode of the MU is one of a speakerphone mode, a telephone-at-ear mode, a scanning mode, a power optimization mode, a lighting setting mode, an antenna selection mode, and an idle mode.

5. A method, comprising:
    defining a plurality of spatial regions relative to a predetermined reference point;
    mapping each of the spatial regions to at least one operating mode of a mobile unit ("MU"), the MU including an application component;
    correlating an orientation and a position of the MU with one of the spatial regions;
    tracking an intended use of the MU when the MU is oriented and positioned within the one spatial region, wherein the intended use includes at least one of using an application executing on the MU and selecting an operating mode of the MU;
    assigning a score to the intended use for the one spatial region when the MU is oriented and positioned within the one spatial region; and
    based on the score, determining an optimized operating mode for the at least one application component of the MU when the MU is oriented and positioned within the one spatial region.

6. The method according to claim 5, further comprising:
    tracking a further intended use of the MU within the one of the plurality of spatial regions;
    adjusting the score based on the further intended use; and based on the score, determining a further optimized operating mode for the at least one application component of the MU when the MU is oriented within the one spatial region.

7. The method according to claim 5, further comprising:
transmitting data gathered from the at least one application component of the MU to a central server.

8. The method according to claim 5, wherein the tracking the intended use of the MU is performed by at least one sensor within the MU.

9. The method according to claim 8, wherein the at least one sensor includes one of a piezoelectric sensor, an optical switch, a multi-axis accelerometer, a pressure gauge, and a micro-electromechanical gyroscope.

10. The method according to claim 5, wherein the at least one application component of the MU is one of a speaker, a microphone, a scanner, an antenna, a display, a touch screen, a camera, a wireless communication interface, and a keypad.

11. The method according to claim 5, wherein the at least one operating mode of the MU is one of a speakerphone mode, a telephone-at-ear mode, a scanning mode, a power optimization mode, a lighting setting mode, an antenna selection mode, and an idle mode.

12. A mobile computing device comprising:
at least one application component for gathering data;
a sensor for tracking an intended use of the mobile computing device within one of a plurality of spatial regions, and for determining an orientation and a position of the mobile computing device within the one spatial region relative to a predetermined reference point, wherein the intended use includes at least one of using an application executing on the mobile computing device and selecting an operating mode of the mobile computing device; and
a processor for assigning a score to the intended use for the one spatial region when the mobile computing device is oriented and positioned within the one spatial region, and for determining an optimized operating mode based on the score for the at least one application component when the mobile computing device is oriented and positioned within the one spatial region.

13. The mobile computing device according to claim 12, wherein the at least one sensor is one of a piezoelectric sensor, an optical switch, a multi-axis accelerometer, a pressure gauge, and a micro-electromechanical gyroscope.

14. The mobile computing device according to claim 12, wherein the at least one application component is one of a speaker, a microphone, a scanner, an antenna, a display, a touch screen, a camera, and a keypad.

15. The mobile computing device according to claim 12, wherein the optimized operating mode is one of a speakerphone mode, a telephone-at-ear mode, a scanning mode, a power optimization mode, a lighting setting mode, an antenna selection mode, and an idle mode.

16. The mobile computing device according to claim 12, wherein the data gathered from the at least one application component is transmitted to a central server.

17. A system, comprising:
a spatial region defining means defining a plurality of spatial regions relative to a predetermined reference point;
a mapping means mapping each one of the spatial regions to at least one operating mode of a mobile unit ("MU"), the MU including an application component;
a correlating means correlating an orientation and a position of the MU relative to the predetermined reference point with one of the spatial regions;
a tracking means tracking an intended use of the MU within the one spatial region, wherein the intended use includes at least one of using an application executing on the MU and selecting an operating mode of the MU;
an assigning means assigning a score to the intended use for the one spatial region when the MU is oriented within the one region; and
a determining means determining, based on the score, an optimized operating mode for the at least one application component of the MU when the MU is oriented and positioned within the one spatial region.

18. The system according to claim 17, wherein the tracking means tracks a further intended use of the MU within the one spatial region, wherein the assigning means adjusts the score based on the further intended use, and wherein the determining means determines, based on the score, a further optimized operating mode for the at least one application component of the MU when the MU is oriented and positioned within the one spatial region.

19. The system according to claim 17, further comprising:
a transmitting means transmitting data gathered from the at least one application component of the MU to a central server.

20. The system according to claim 17, wherein the tracking means includes at least one sensor within the MU.

21. The system according to claim 20, wherein the at least one sensor is one of a piezoelectric sensor, an optical switch, a multi-axis accelerometer, a pressure gauge, and a micro-electromechanical gyroscope.

22. The system according to claim 17, wherein the at least one application component of the MU is one of a speaker, a microphone, a scanner, an antenna, a display, a touch screen, a camera, a wireless communication interface, and a keypad.

23. The system according to claim 17, wherein the at least one operating mode of the MU is one of a speakerphone mode, a telephone-at-ear mode, a scanning mode, a power optimization mode, a lighting setting mode, an antenna selection mode, and an idle mode.

* * * * *

UNITED STATES PATENT AND TRADEMARK OFFICE
CERTIFICATE OF CORRECTION

PATENT NO. : 8,099,124 B2  
APPLICATION NO. : 11/734366  
DATED : January 17, 2012  
INVENTOR(S) : Tilley Page 1 of 1

It is certified that error appears in the above-identified patent and that said Letters Patent is hereby corrected as shown below:

On the Title Page, in the figure, delete Tag "250" and insert Tag -- 230 --, therefor.

In Fig. 2, Sheet 2 of 3, delete Tag "250" and insert Tag -- 230 --, therefor.

In Column 12, Line 34, delete "determiner" and insert -- determine --, therefor.

In Column 16, Line 19, in Claim 17, delete "one region;" and insert -- one spatial region; --, therefor.

Signed and Sealed this
Eighteenth Day of December, 2012

David J. Kappos
*Director of the United States Patent and Trademark Office*